(12) United States Patent
Ikuta

(10) Patent No.: US 6,431,482 B1
(45) Date of Patent: Aug. 13, 2002

(54) DUAL-BEARING REEL SPOOL-LOCKING MECHANISM

(75) Inventor: Takeshi Ikuta, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/930,156

(22) Filed: Aug. 16, 2001

(30) Foreign Application Priority Data

Aug. 22, 2000 (JP) ........................................ 2000-251324

(51) Int. Cl.$^7$ ............................................... A01K 89/02
(52) U.S. Cl. ........................................ 242/297; 242/247
(58) Field of Search ................................. 242/247, 297, 242/298, 299, 302, 322

(56) References Cited

U.S. PATENT DOCUMENTS

| | | | | |
|---|---|---|---|---|
| 3,044,730 A | * | 7/1962 | Yeada | 242/297 |
| 3,061,232 A | * | 10/1962 | Clark | 242/297 |
| 4,446,433 A | * | 5/1984 | Shuck | 324/338 |
| 4,899,953 A | | 2/1990 | Toda | |
| 5,328,138 A | | 7/1994 | Sakaguchi | |
| 5,407,144 A | * | 4/1995 | Ryall | 242/295 |
| 6,123,280 A | * | 9/2000 | Yuen et al. | 242/247 |

* cited by examiner

Primary Examiner—Emmanuel M. Marcelo
(74) Attorney, Agent, or Firm—Shinjyu Global IP Counselors, LLP

(57) ABSTRACT

Dual-bearing reel spool-locking mechanism unlikely to break or deform even when acted upon by abnormal force. The dual-bearing reel spool-locking mechanism (8) locks a spool (3), flanged endwise with a pair of flanges (3b) and fitted to the dual-bearing-reel reel body to permit rotating in either rotational direction, against rotation in the line reeling-out direction, and is furnished with a locking piece (21), a shifting mechanism (22), and locking recesses (23). The locking piece (21) is fitted in the reel body to allow it to shift into advanced and retracted positions. The lock shifting mechanism (22) is for shifting the locking piece (21) into the advanced and retracted positions. The leading end of the locking piece (21) advanced into the advanced position is engageable into one of the locking recesses (23), which are provided on the outer face of the flange (3b) on the handle-mounting side.

15 Claims, 6 Drawing Sheets

DUAL-BEARING REEL SPOOL-LOCKING MECHANISM

BACKGROUND OF THE INVENTION

1. Technical Field

The present invention relates to spool-locking mechanisms in fishing reels; more particularly, to dual-bearing reel spool-locking mechanisms for locking endwise-flanged spools, fitted in the reel body to permit them to spin in either rotational direction, against rotation in at least the line reeling-out direction.

2. Description of Related Art

Dual-bearing reels generally comprise a reel body that attaches to a fishing rod, and a line-winding spool fitted rotatively in the reel body. The spool has a bobbin trunk onto which fishing line is wound, and a pair of flanges formed on the ends of the bobbin trunk.

Among dual-bearing reels having this type of configuration, reels provided with a spool-locking mechanism for recovering the terminal tackle when it gets snagged are known. Conventional spool-locking mechanisms for dual-bearing reels include a rotor that is fitted non-rotatively to the spool shaft, a locking member that is fitted to be shiftable in the radial direction of the rotor and that locks the rotor, and a shifting mechanism that shifts the locking member between two positions. The rotor normally includes a circumferentially spaced plurality of teeth formed on its outer periphery, and is fastened to the spool shaft by suitable fastening means such as a serrations joint. Taking into consideration the available space within the reel, the outer diameter of the rotor cannot be made too large, and is normally smaller than the outer diameter of the bobbin trunk. The locking member is fitted to the reel body to allow it to shift radially with respect to the rotor into a contacting position where it contacts the teeth and a parted position where it is parted away from the teeth.

In a dual-bearing reel configured this way, if the terminal tackle gets snagged, the locking member is shifted into the contacting position by the shifting mechanism to lock the rotor. The spool shaft is thereby rotationally immobilized, and furthermore the spool is non-rotatably interlocked. After the fishing line is reeled and slack in the line taken up, the fishing rod is directed toward the terminal tackle and tugged straight back. Doing this breaks the snag, or the snagged fishing hook(s), fishing line or tangle therein, so that the terminal tackle or a portion of the tackle may be recovered.

In the foregoing conventional spool-locking mechanism, the spool is locked via the rotor, which is fitted non-rotatively to the spool shaft. In fishing rigs with line having a high breaking strength, when attempting to free terminal tackle from a snag, abnormal force therefore acts on the rotor and the locking member, which poses the risk, for example, of damaging the fixed portions of the spool shaft and the rotor. Damage to the fixed portion of the rotor makes the spool-locking mechanism unusable, which means that the spool has to be replaced.

Additionally, if the outer diameter of the rotor is smaller than that of the bobbin trunk, the force acting on the locking member is greater than the tension acting on the fishing line, which risks deforming the locking member.

SUMMARY OF THE INVENTION

An object of the present invention is in keeping a dual-bearing reel spool-locking mechanism from being damaged or deformed even if acted upon by abnormal force.

According to a first aspect of the present invention, a dual-bearing reel spool-locking mechanism for locking a spool, which is flanged endwise with a pair of flange portions and fitted to the dual-bearing-reel reel body to permit rotating in either rotational direction, in at least its line reeling-out direction, includes: a locking piece, a shifting mechanism, and a locking recess. The locking piece is mounted to the reel body such that it can shift between an advanced position and a retracted position. The shifting mechanism is for shifting the locking piece into the advanced position and the retracted position. The locking recess, into which the leading end of the locking piece when advanced into the advanced position is engageable, is provided on the outside face of one the flange portions.

In this dual-bearing reel spool-locking mechanism, if the terminal tackle gets snagged, the shifting mechanism shifts the locking piece from the retracted position into the advanced position. As a result, the locking piece engages the locking recess provided on the outer surface of the spool, and the spool is locked. In this state, the fishing rod is tugged directly backwards to break, for example, the fishhook. When the locking piece is shifted from the advanced position into the retracted position, it is separated from the locking recess and permits the spool to freely rotate, and the tackle can be recovered. In this configuration, the spool is locked by the engaging the locking piece with a locking recess provided on the spool, so that the spool can be directly locked, making the spool-locking mechanism less susceptible to breakage or deformation if acted on by abnormal force. Furthermore, since the locking recess is provided on the outer surface of the flange portion, the locking recess is disposed in a section whose diameter is equal to or greater than the normal winding diameter of the fishing line when being reeled out. For this reason, the force applied to the locking piece is equal to or less than the tension on the fishing line. This makes it even more unlikely that the spool-locking mechanism is broken or deformed.

According to a second aspect of the present invention, in a dual-bearing reel spool-locking mechanism as in the first aspect, a plurality of locking recesses is provided spaced circularly with respect to the spool rotationally. With this configuration, the number of lock positions in the rotating direction is increased, because a plurality of locking recesses is provided.

According to a third aspect of the present invention, in a dual-bearing reel spool-locking mechanism as in the second aspect, the locking recesses are cut-outs that are formed at a certain spacing in a circumferential direction on a ring-shaped lock plate disposed on the outside surface of said flange portion. With this configuration, because the cut-outs are locking recesses formed on the lock plate, their production is simpler than in a configuration in which the locking recesses are directly formed in the spool.

According to a fourth aspect of the present invention, in a dual-bearing reel spool-locking mechanism as in the third aspect, where it opposes the cut-out formations the outside face of the flange portion is sunken beyond the rest. With this configuration, a channel is formed on the outer surface of the spool, making it possible for the locking piece to pass through the locking recess. For this reason, the locking strength is increased.

According to a fifth aspect of the present invention, in a dual-bearing reel spool-locking mechanism as in the first aspect, the locking piece is mounted to the same side of the reel body as the handle. With this configuration, the lock control can be easily actuated with the hand that controls the handle, because the locking piece is disposed on the same side as the handle, so that the control parts are concentrated on one side.

According to a sixth aspect of the present invention, in a dual-bearing reel spool-locking mechanism as in the first aspect, the locking piece is mounted to the reel body and can be shifted into the advanced position and the retracted position along a shifting axis that is parallel to a rotation axis of the spool, and includes a shifting member whose tip engages the locking recesses; the shifting mechanism including a pivot member mounted to the reel body pivotally around the shifting axis, an urging member which urges the shifting member into the advanced position, and a cam mechanism that in response to pivoting the pivot member shifts the shifting member from the advanced position into the retracted position against a spring force of the urging member. With this configuration, when the pivot member is pivoted in one direction, the cam mechanism shifts the shifting member from the advanced position into the retracted position along the shifting axis against the spring force of the urging member. When it is pivoted in the opposite direction, the urging force of the urging member shifts the shifting member from the retracted position into the advanced position. With the cam mechanism and urging member, the pivoting of the pivot member around the shifting axis can be converted with a simple structure into a shifting motion along the shifting axis of the shifting member.

According to a seventh aspect of the present invention, in a dual-bearing reel spool-locking mechanism as in the sixth aspect, the cam mechanism includes a sloping cam face formed helically on the pivot member, and a cam pin attached to a rear end portion of the shifting member for being engaged by the sloping cam surface.

According to an eighth aspect of the present invention, in a dual-bearing reel spool-locking mechanism as in the first aspect, the locking piece in the advanced position permits rotation of said spool in the line reeling-in direction. With this configuration, even in a state where the locking piece is shifted into the advanced position, rotation by the spool in the line reeling-in direction is permitted. Thus, even without shifting into the retracted position, the terminal tackle or a portion of the tackle may be swiftly recovered after snag is cleared.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

Figure 1:
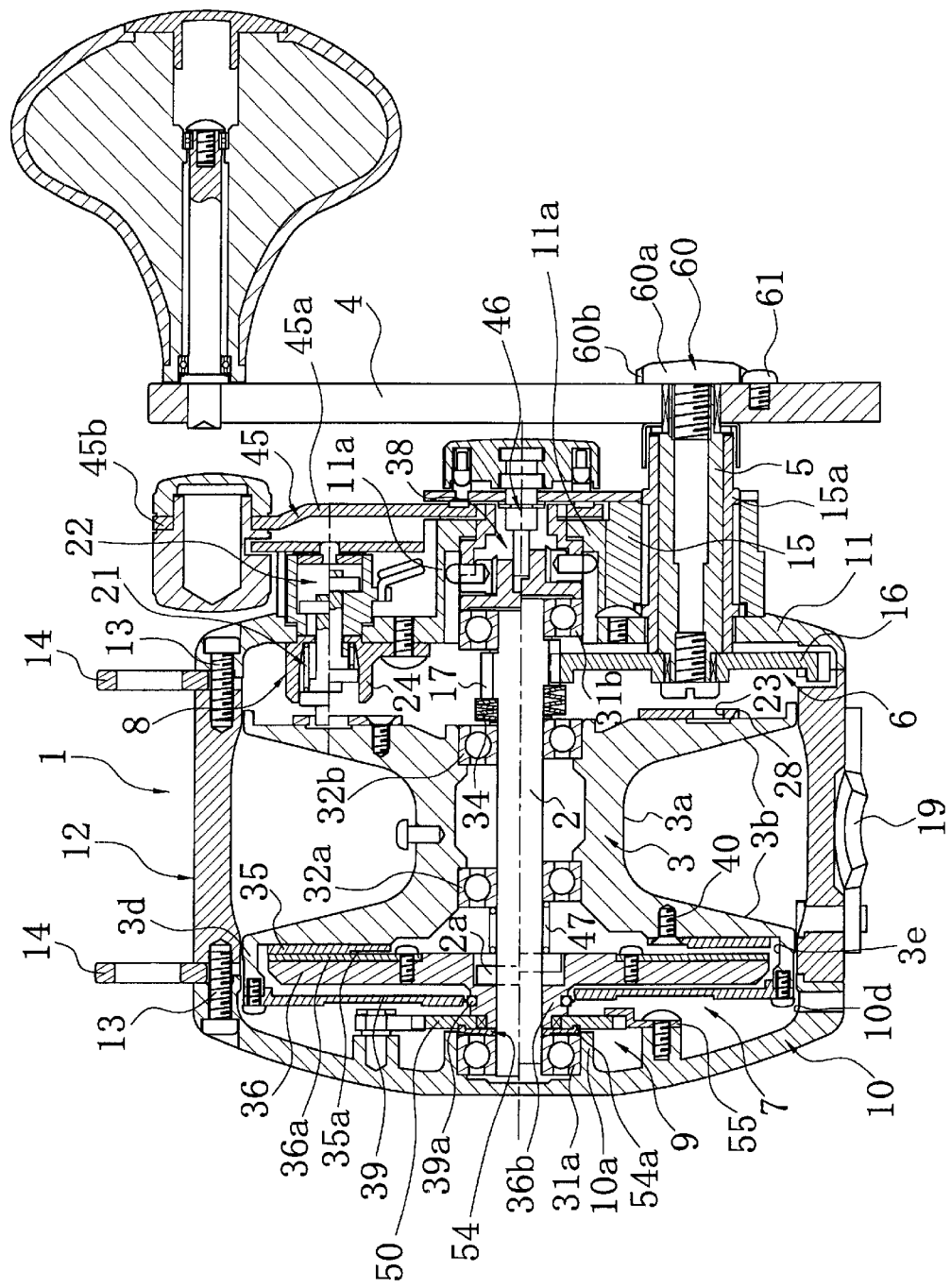
FIG. 1 is a sectional view of a lever-drag reel in one embodiment of the present invention.

The dual-bearing reel shown in FIG. 1, in which an embodiment of the present invention is adapted, is a lever-drag reel furnished with a cylindrical reel body 1, a spool shaft 2 mounted rotatably in the central part of the reel body 1, a spool 3 rotatably supported on the spool shaft 2 but axially immobile with respect thereto, and a handle 4 disposed laterally on the reel body 1. Inside the reel body 1, the lever drag reel is provided with a rotation transmission mechanism 6 for transmitting rotation from the handle 4 to the spool 3, a lever drag mechanism 7 for braking rotation of the spool 3 in its line reeling-out direction, a spool-locking mechanism 8 for locking the spool 3, and a reverse-check mechanism 9 for checking rotation of the lever drag mechanism 7 in the reeling-out direction.

Reel Body Configuration

The reel body 1 contains a pair of metal, plate-shaped left and right side plates 10 and 11, and a metal, perforated cylindrical reel body 12. The side plates 10 and 11 are joined coaxially to the two ends of the reel body 12 by spigot joints and fastened by a plurality of fastening bolts 13. A pair of harness lugs 14, which are used for supporting the reel with the angler's body, is mounted between the side plates 10 and 11 and the reel body 12. The approximately central portions of the side plates 10 and 11 rotatably support the two ends of the spool shaft 2. A cylindrical bearing accommodating portion 10a that protrudes inward is formed in the center of the inner face of the left side plate 10. Also, an inner portion 10d of the left side plate 10 at the spigot joint portion is cut away, except at the portions of the fastening bolts 13, to reduce its wall thickness. This is done to lighten the reel body 1. A boss portion 11a protruding away from the shaft is formed in the central portion of the right side plate 11 (on the handle 4 side) to support the spool shaft 2. A thick-walled, disk-shaped bearing block 15 for mounting the handle shaft 5 of the handle 4 is screwed fast around the boss portion 11a. The bottom part of the reel body 12 is provided with a rod attachment part 19 for mounting the reel onto a fishing rod.

The spool shaft 2 is rotatably supported by the side plates 10 and 11 of the reel body 1 on a pair of left and right bearings 31a and 31b disposed on either end of the spool 2. Also, the spool 3 is rotatably supported by two bearings 32a and 32b that are disposed at the two ends of the spool 3, spaced axially inward of the bearings 31a and 31b. The bearing 31a on the left side is accommodated by the bearing accommodating portion 10a formed on the left side plate 10. The bearing 31b on the right side is mounted on the boss portion 11a formed on the right side plate 11. The components of a drag shift mechanism 38 (described later) of the lever drag mechanism 7 are in contact with the right side of the outer race of the bearing 31b at the right end of the spool shaft 2. Additionally, a pinion gear 17 (described later) of the rotation transmission mechanism 6 adjoins the left side of the inner race of the bearing 31b. The reverse-check mechanism 9 adjoins the right side of the inner race of the bearing 31a on the left end of the spool shaft 2. Further, the inner surface of the side plate 10 adjoins the left end of the outer race. The spool 3 abuts on the left side of the outer race of the bearing 32b on the right side, which supports the spool 3. Further, four plate springs 34 abut on the right side of the inner race of bearing 32b via a washer (not shown in the drawings). The plate springs 34 are provided so that the drag force can be adjusted over a broad range without suddenly increasing the drag force when pivoting the braking control lever (described below). A later described friction disk 36 on the lever drag mechanism 7 abuts via a return spring 47 on the left side of the inner race of the left bearing 32a, which supports the spool 3. The right side of its outer race abuts against the spool 3.

The spool 3 is made up of a bobbin trunk 3a and flange portions 3b that are formed integrally with the bobbin trunk 3a on either end. The spool-locking mechanism 8 is provided on the outer side of the flange portion 3b on the right side (handle-mounting side) in FIG. 1. Further, a braking disk 35 of the lever drag mechanism 7 is mounted to the outer side of the flange portion 3b on the left side in FIG. 1. In order to attach a cover 39 to cover the braking disk 35, a cylindrical part 3d extending outward in the spool shaft direction is formed on the outer periphery of the left flange portion 3b. A portion of the inner periphery 3e of the cylindrical part 3d is cut away to reduce its wall thickness. This is done to lighten the spool 3 and reduces its inertia.

Spool-Locking Mechanism Configuration

Figure 2:
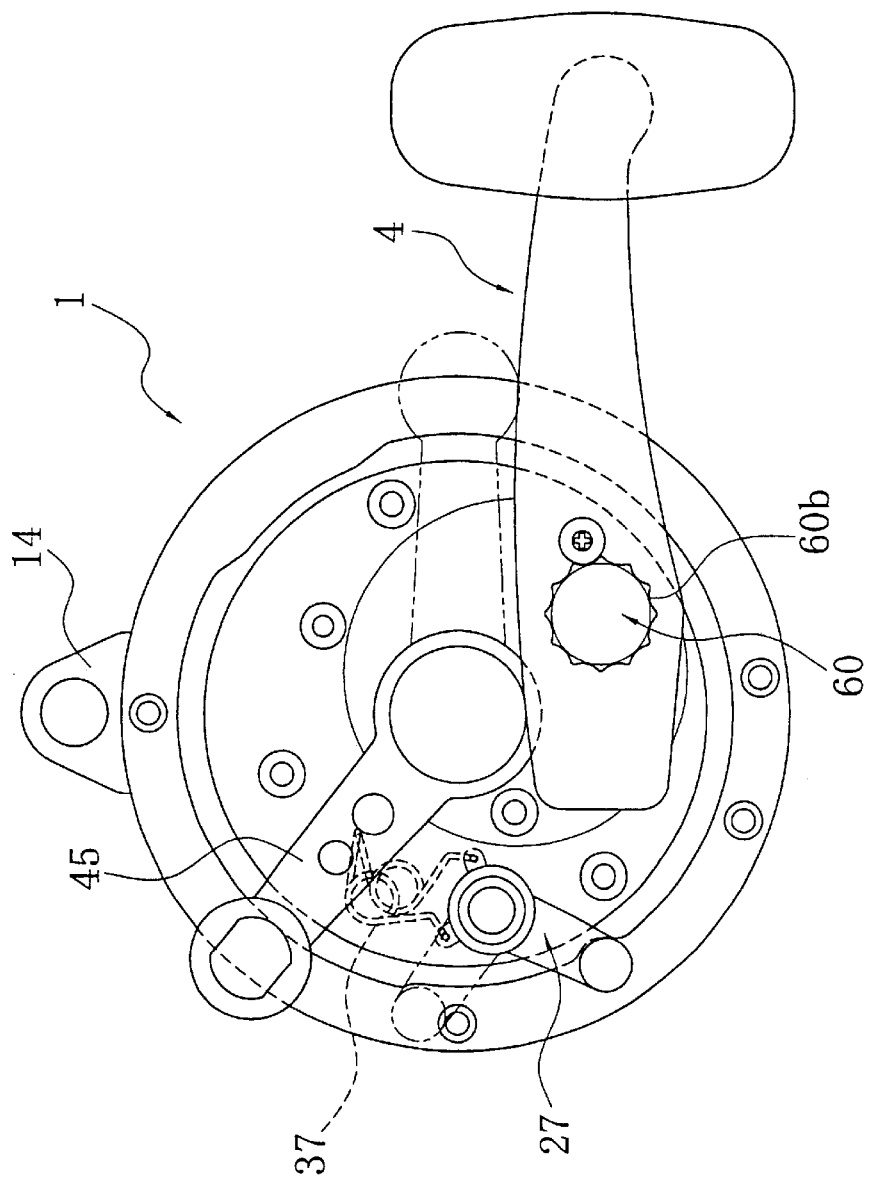
FIG. 2 is a lateral view of the FIG. 1 lever-drag reel.
Figure 3:
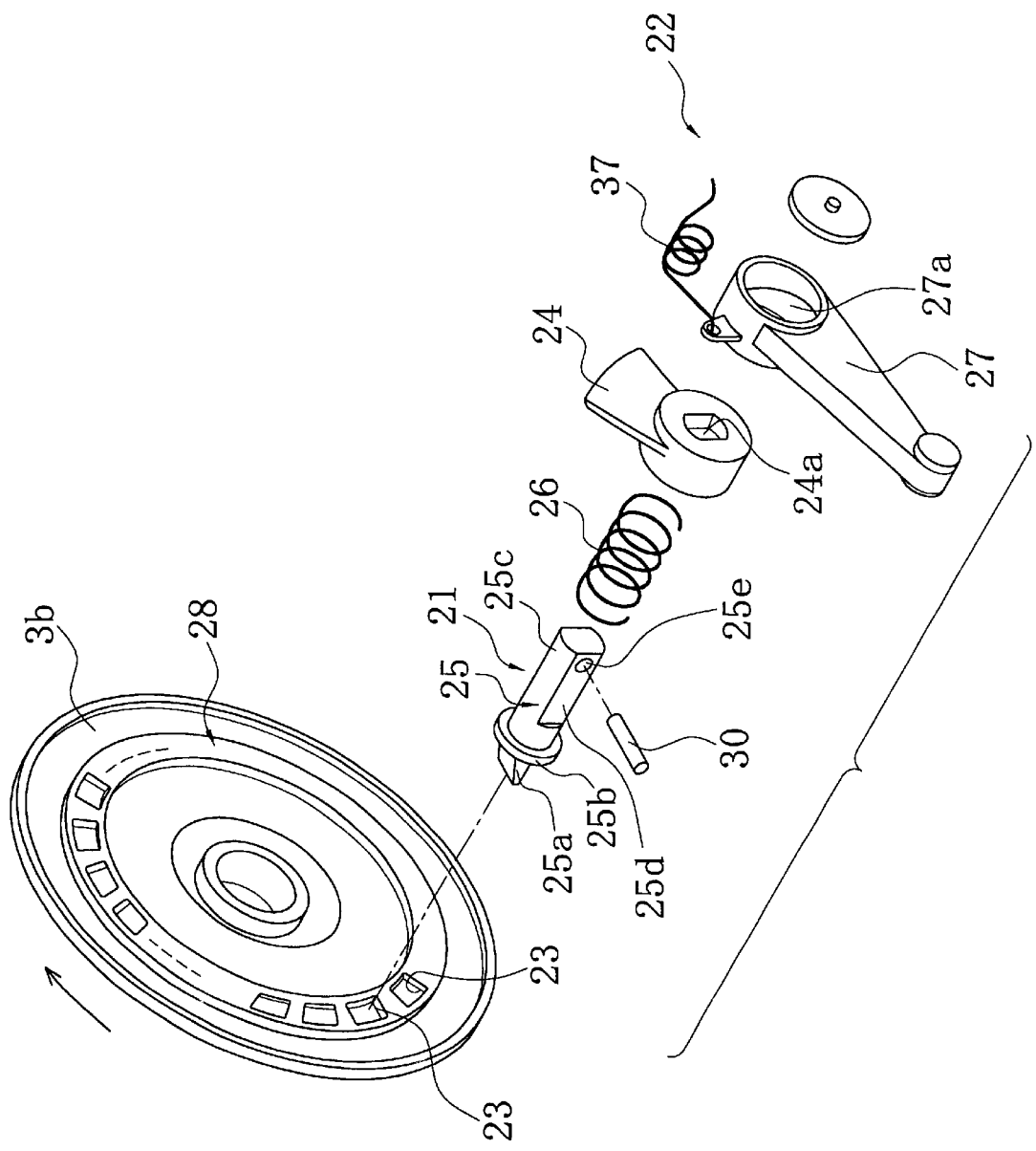
FIG. 3 is an exploded oblique view of a spool-locking mechanism from the FIG. 1 reel.
Figure 4A:
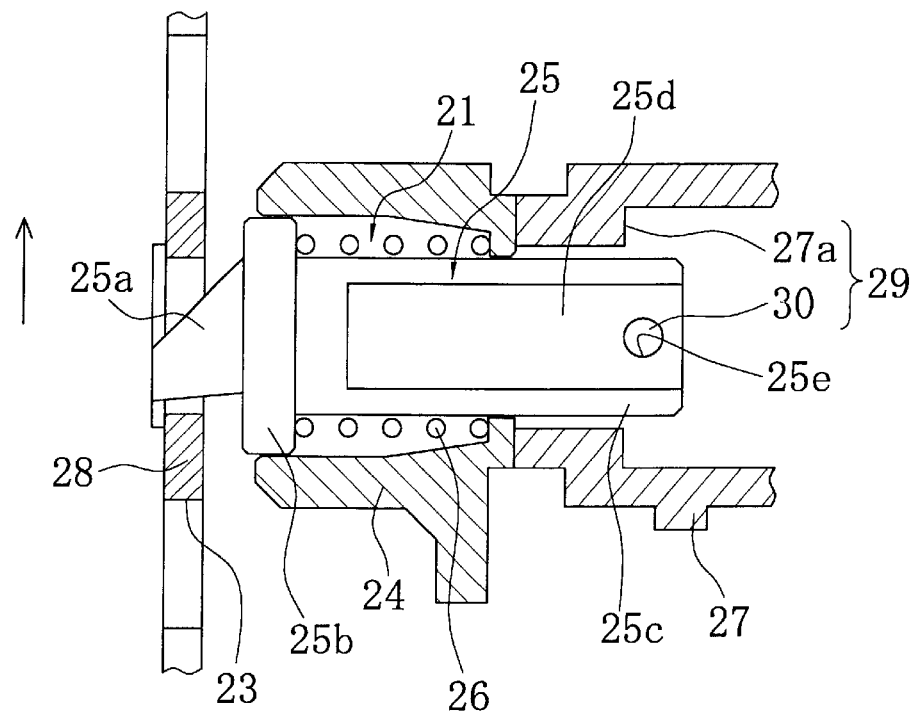
FIGS. 4A and 4B are enlarged fragmentary sectional views of the spool-locking mechanism.
Figure 4B:
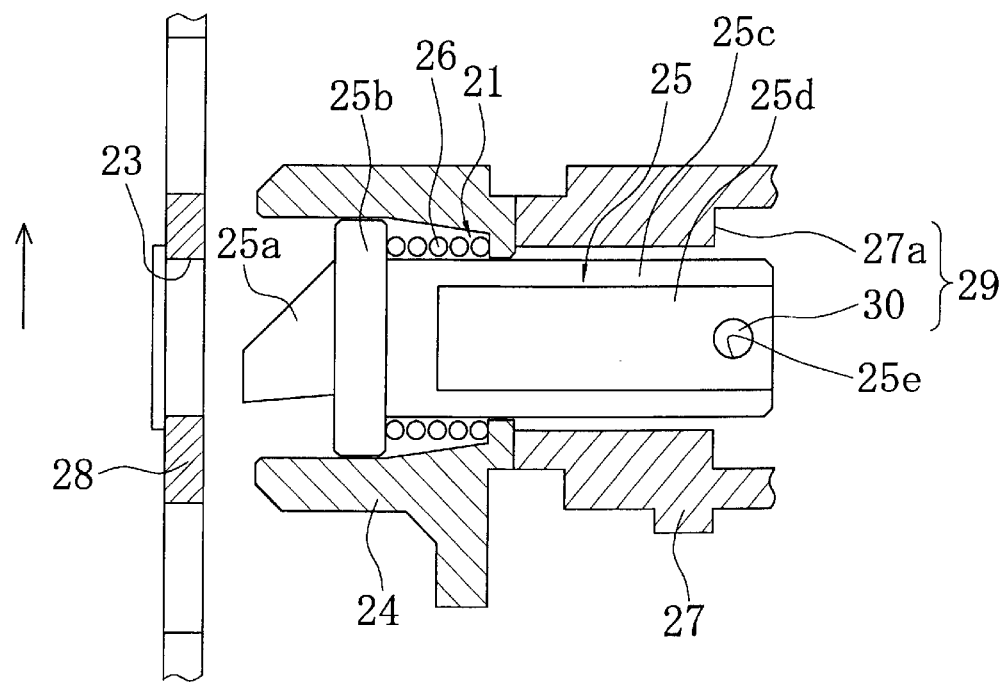

The spool-locking mechanism 8 permits rotation of the spool 3 in the direction the line is reeled in and locks rotation in the direction in which the line is reeled out. As shown in FIG. 2, it is disposed near the rear of the reel body 1. The spool-locking mechanism 8, as shown in FIG. 3 and FIG. 4, is provided with a locking piece 21 mounted to the reel body 1 so that it can shift between an advanced position (FIG. 4A) and a retracted position (FIG. 4B), a lock shifting mechanism 22 that shifts the locking piece 21 between the advanced position and the retracted position, and locking recesses 23, which are provided on the outer surface of the flange portion 3b, and into which the tip of the locking piece 21 is engageable when advanced into the advanced position.

The locking piece 21 has a shifting member 25 fitted, in an accommodating member 24 fixed to the side plate 11, to allow it to shift along an axis parallel to the spool shaft 2. The shifting member 25, which is rod-shaped, has, from the leading-end side, a locking protrusion 25a, a brim 25b, a shaft 25c, and chamfered portions 25d. The upstream side in the line reel-out direction (indicated by the arrow in FIG. 4) of the locking protrusion 25a, which is a protrusion for engagement with the locking recesses 23, is formed at an acute angle, and the downstream side at an obtuse angle. While the thus formed locking protrusion 25a is interlocked with a locking recess 23, when the locking recess 23 comes into contact with the acute-angled side, the shifting member 25, even if somewhat tilted, will securely bite into the locking recess 23 and lock the spool 3; and when the locking recess 23 comes into contact with the obtuse-angled side, the shifting member 25 will be retractable by action of the locking recess 23. The brim 25b is for interlocking with a coil spring 26 that is component of the lock shifting mechanism 22. The coil spring 26 is disposed inside the accommodating member 24 around the shaft 25c of the shifting member 25. The coil spring 26 urges the shifting member 25 toward the locking recesses 23. The shaft 25c is supported permitting it to shift axially in the accommodating member 24. The shaft 25c is also non-rotatably interlocked with the accommodating member 24 by the chamfered portions 25d. That is, a rounded notch 24a into which the chamfered portions 25d can interlock is formed in one end of the accommodating member 24. Thus, the shifting member 25 is mounted to the reel body 1 non-rotatably yet allowed to shift axially. A radially extending through-hole 25e is formed in the shifting member 25 at the rear end of the chamfered portions 25d. A cam pin 30 that is a component of the lock shifting mechanism 22 is fitted in the through-hole 25e. The cam pin 30 also serves as an advanced-position-ward locator for the shifting member 25. By means of the locking protrusion 25a conformed as noted above and the pressing force due to the coil spring 26, when the shifting member 25 shifted into the advanced position engages a locking recess 23, rotation in the line reel-in direction is permitted and rotation in the line reel-out direction is locked.

The locking recesses 23 are constituted by cut-outs, circumferentially spaced along the rotational direction, in a lock plate 28. The lock plate 28 is a ring-shaped plate that is fastened to the outer surface of the right flange 3b on the spool 3 in FIG. 1. In the outer surface of the spool 3 flange portion 3b where the locking recesses 23 are formed, an annular recessed escape portion 3c is formed opposing the locking recesses 23. Forming the escape portion 3c in this fashion lets the locking protrusion 25a of the shifting member 25 penetrate the locking recess 23.

The lock shifting mechanism 22 includes a locking lever 27 mounted to the side plate 11 for pivoting around the shifting member 25 shaft, the coil spring 26 mentioned above, and a locking cam mechanism 29, which in response to pivoting by the locking lever 27 shifts the shifting member 25 from the advanced position into the retracted position against the spring force of the coil spring 26. As shown in FIG. 2, the locking lever 27 is urged by a toggle spring 37 into an advancing posture, indicated by phantom lines and corresponding to the advanced position, and a retracting posture, indicated by solid lines and corresponding to the retracted position. The locking cam mechanism 29 includes a slanted cam surface 27a formed helically on the base-end inner wall surface of the locking lever 27, and the cam pin 30 mounted to the rear end of the shifting member 25 so as to engage the slanted cam surface 27a.

As shown in FIGS. 1 and 2, the handle 4 is fastened by a fastening bolt 60 to the protruding end of the cylindrical handle shaft 5, which is disposed below and runs parallel to the spool shaft 2. A brim 60a is formed on the fastening bolt 60. The brim 60a is provided with twelve circumferentially spaced arc-shaped recesses 60b, and is held in place by a screw 61, the head of which engages the recesses 60b. The handle shaft 5 is rotatably mounted to a cylindrical member 15a inserted into the bearing block 15 arranged frontward below the boss portion 11a. A main gear 16 is mounted non-rotatively to the tip of the handle shaft 5.

As shown in FIG. 1, the rotation transmission mechanism 6 includes the main gear 16, which is supported rotatively by the handle shaft 5 of the handle 4, and the pinion gear 17, which is formed in one piece with the spool shaft 2. Rotation from the handle 4 is transmitted to the spool shaft 2 via the handle shaft 5, the main gear 16, and the pinion gear 17.

As shown in FIG. 1, the lever drag mechanism 7 includes the braking disk 35, which is attached to the outer surface of the left flange portion 3b of the spool 3 as shown in FIG. 1, the friction disk 36 disposed so that it may come into contact with the braking disk 35, and the drag shift mechanism 38 for shifting the spool 3 and the friction disk 36 back and forth in the direction of the spool shaft.

The braking disk 35 is for example a stainless steel washer-shaped disk member that is mounted non-rotatably with respect to the spool 3 on the outer surface of the left flange portion 3b of the spool 3 by means of a radially inward, circumferentially spaced plurality of attaching screws 40 on the lateral surface. An attaching portion 35a for attaching the screws 40 on the braking disk 35 forms an annular recess that is depressed below the radial outward portion. Accordingly, the drag area, in particular the radially outward drag area, is not reduced, making it possible to use the maximum diameter of the braking disk 35 corresponding to the outer diameter of the spool 3.

The friction disk 36 is arranged in opposition to the braking disk 35. A ring-shaped friction plate 36a made of abrasion-resistant material, for example carbon graphite or fiber-reinforced resin, is fastened to the surface of the friction disk 36, opposite of the braking disk 35, by an appropriate fastening means, such as screws. The friction disk 36 includes at its center a tubular boss portion 36b protruding axially outward. The boss portion 36b interlocks with a pin 2a, which is attached to the spool shaft 2 and passes through it radially. Accordingly, the friction disk 36 is mounted on the spool shaft 2 non-rotatably and rotates together with the spool shaft 2. Further, a ratchet wheel 50 of the reverse-check mechanism 9 is fitted, non-rotatably yet free to shift axially, to the FIG. 1 left-end surface of the boss portion 36b on the friction disk 36. Additionally, a cover member 39 covers the friction disk 36. The boss portion 36b on the friction disk 36 passes through the cover member 39 and extends toward the bearing 31a. A sealing member 39a is interposed between the penetrated part of the cover member 39 and the boss portion 36b.

Reverse-Check Mechanism Configuration

Figure 5:
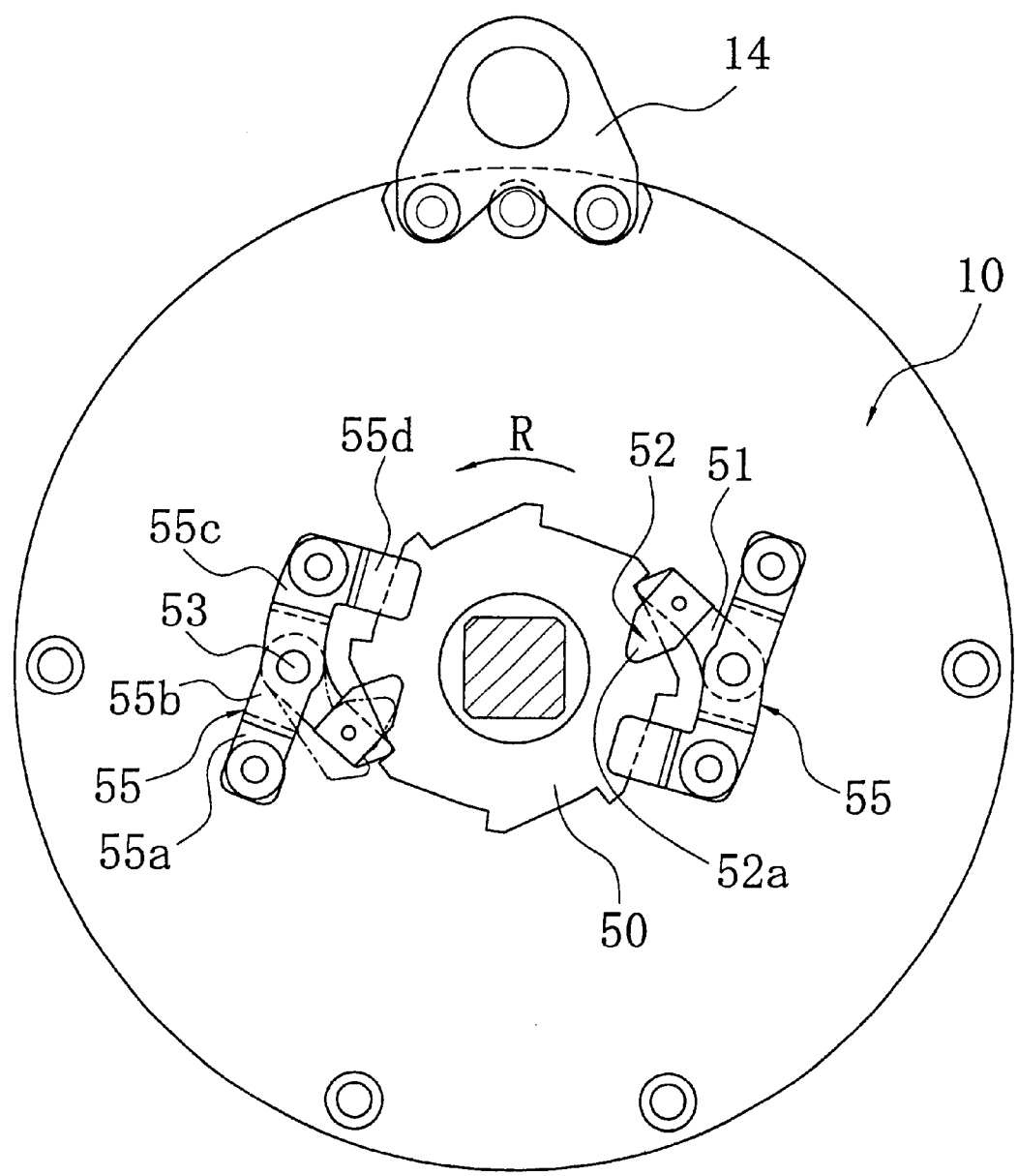
FIG. 5 is an enlarged elevational view of a reverse-check mechanism from the FIG. 1 reel.
Figure 6:
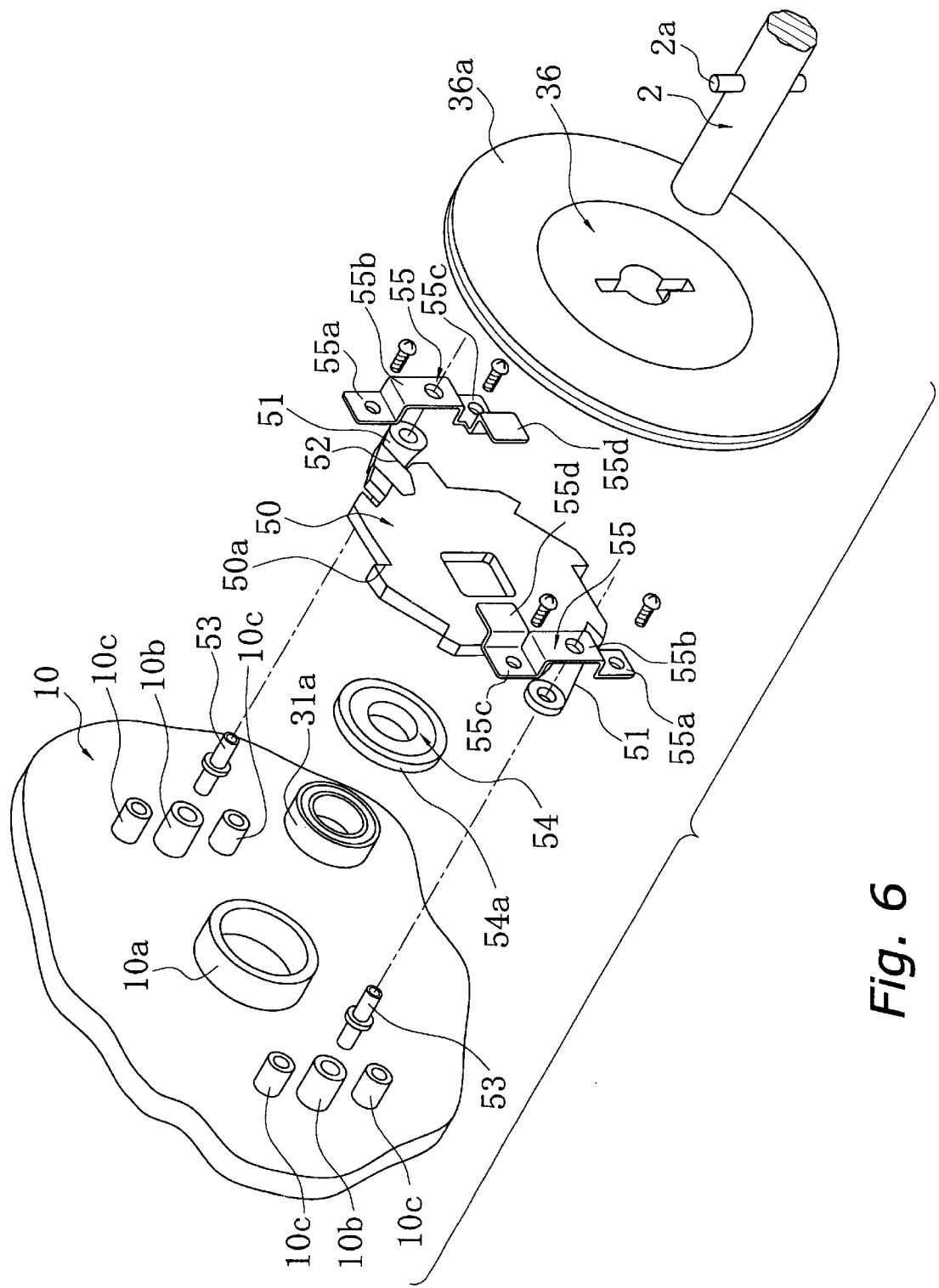
FIG. 6 is an exploded oblique view of the reverse-check mechanism.

As shown in FIG. 5 and FIG. 6, the reverse-check mechanism 9 is a ratchet-type one-way clutch including a ratchet wheel 50 on the circumferential surface of which saw teeth 50a are formed, and a pair of ratchet pawls 51 that interlock with the tip of the saw teeth 50a and are disposed on the outer periphery of the ratchet wheel 50.

The ratchet wheel 50 is attached non-rotatably yet free to shift axially outward (to the left in FIG. 1) by a suitable interlocking means, for example by serrations, to the outer surface of the boss portion 36b of the friction disk 36. This results in the ratchet wheel 50 being mounted to the spool shaft 2, via the friction disk 36, non-rotatably yet free to shift in the axial direction. The ratchet wheel 50 includes a ring-shaped abutting member 54 coaxially fitted to its left surface in FIG. 1. The abutting member 54 abuts on the right lateral surface of the inner race of the bearing 31a and includes a positioning part 54a, which is disposed adjacent to the inner surface of the bearing accommodating portion 10a, on its outer surface. Thus providing the abutting member 54 centers the ratchet wheel 50 with respect to the side plate 10, facilitating assembly of the ratchet wheel 50. Note that the outer race of the bearing 31a is in contact with the side plate 10, as described above.

The ratchet wheel 50 is clamped to the side plate 10 by a pair of clamping members 55. The clamping members 55 are plate-like members made of metal, for example a stainless steel alloy, with first end portions 55a that are fastened to the side plate 10. The clamping members 55 are provided with a central portion 55b, which is bent from the first end portion 55a into a crank-shape on the friction disk 36 side and spans over the ratchet pawls 51, and a fastening portion 55c, which is bent into a crank-shape on the side plate 10 side. The fastening portion 55c is also fastened to the side plate 10. The clamping members 55 are also provided with second end portions 55d, which are bent in a crank-shape and curve from the fastening portion 55c toward the ratchet wheel. The second end portions 55d are disposed in a position where they oppose the lateral surface of the ratchet wheel 50 on the friction disk 36 side. The ratchet wheel 50 is clamped by these second end portions 55d. Also, the ratchet pawls 51 are clamped, and their axial travel restrained, by the central portions 55b.

A pair of ratchet pawls 51 is disposed in positions that are point symmetrical to the spool shaft axis, and are mounted pivotably between a contact posture, in which they are in contact with the saw teeth 50a to the inner surface of side plate 10, and a separated posture, in which they are separated from the saw teeth 50a. The tips of the ratchet pawls 51 are disposed from the pivoting shaft axis on the downstream side of the ratchet wheel 50 in the direction R in which fishing line is reeled in. A pair of pawl bosses 10b, for mounting the ratchet pawls 51 so that they may freely pivot, are formed in symmetrical positions on the side plate 10 flanking the bearing accommodating member 10a. Two attachment bosses 10c are formed in symmetrical positions flanking the pair of pawl bosses 10b. Pivot pins 53 for mounting the ratchet pawls 51 pivotably to the side plate 10 are fitted to the pawl bosses 10b. The clamping members 55 also clamp the pivot pins 53, checking their axial shifting. The two attachment bosses 10c are provided to screw the clamping members 55 with the first end portions 55a and the fastening portions 55c to the side plate 10.

A grasping member 52, which is bent into a C-shape, is fitted on and fastened to the central portion of the ratchet pawls 51. A pair of tips 52a of the grasping member 52 resiliently contacts the surface of either side of the ratchet wheel 50, and grasps the ratchet wheel 50. When the ratchet wheel 50 rotates in the direction R in which fishing line is reeled in, the grasping member 52 urges the ratchet pawls 51 into the separated posture through friction with the ratchet wheel 50. The urged ratchet pawls 51 come into contact with the clamping member 55 and are supported in the separated position. Additionally, rotating the ratchet wheel 50 in reverse to the direction in which the line reels out urges the ratchet pawls 51 into the contact posture through friction with the ratchet wheel 50. Accordingly, when the line is reeled in the ratchet pawls 51 no longer come into contact with the saw teeth 50a of the ratchet wheel 50, which suppresses noise. This furthermore curbs increase in rotational resistance, and curbs degradation in the reeling-in efficiency of the spool 3 as well.

As a result the friction disk 36 cannot shift axially outward with respect to the spool shaft (leftward in FIG. 1), i.e., away from the braking disk 35, and the reverse-check mechanism 9 allows the friction disk 36 to rotate in the line reeling-in direction but prohibits it from rotating in the line reeling-out direction.

Here, in the brake-released state, as shown beneath the spool shaft in FIG. 1, a gap opens between the friction plate 36a of the friction disk 36 and the braking disk 35, and in the braked state, as shown above the spool shaft in FIG. 1, the friction plate 36a and the braking disk 35 adhere. The drag force is changed by adjusting the degree of adherence.

As shown in FIG. 1, the drag shift mechanism 38 includes a brake control lever 45 provided pivotally on the reel body 1, a pressing mechanism 46, which, in response to pivoting the brake control lever 45 clockwise in FIG. 2, presses against the spool 3 and the braking disk 35 and shifts them to the left in FIG. 1, and a return spring 47, which is disposed between the friction disk 36 and the spool 3 and shifts the spool to the right in FIG. 1 in response to the brake control lever 45 pivoting counterclockwise in FIG. 2.

The return spring 47 is mounted around the spool shaft 2 between the friction disk 36 and the bearing 32a in a compressed state, and the friction disk 36 urges the braking disk 35 (the spool 3) into a separated direction, urging the braking disk 35 (the spool 3) to the right in FIG. 1.

The brake control lever 45 is mounted to the reel body 1 for pivoting between the braking release position, as shown by the solid line in FIG. 2, and the maximum braking position, as shown by the phantom line. The brake control lever 45 includes a lever portion 45a that is pivotally mounted to the boss portion 11a, and a knob portion 45b that is fastened to the end of the lever portion 45a. The base end of the lever portion 45a interlocks non-rotatably with the pressing mechanism 46.

The following is an explanation of the braking action by the lever drag mechanism 7.

In the lever drag mechanism 7, when the brake control lever 45 is pivoted from the brake position, as shown by the phantom line in FIG. 2, into the braking release position, as shown by the solid line, the state shown above the spool axis in FIG. 1 is switched into the state shown beneath the spool axis. First, the spool 3 is pressed by the spring force of the return spring 47 and shifted to the right in FIG. 1. Then, a gap opens between the braking disk 35 and the friction disk 36. The spool 3 is further pushed via the bearing 32a and shifted to the right. This releases the brake on the spool 3. On the other hand, when the spool 3 shifts, the press mechanism is pushed via the bearing 32b, the disk springs 34, the pinion gear 17, and the bearing 31b, and retreats to the right in FIG. 1. Thus, when the brake control lever 45 is pivoted into the brake release position, there is a shift into the state below the spool axis in FIG. 1.

On the other hand, when the brake control lever 45 is pivoted from the brake release position, as shown by the solid line in FIG. 2, into the brake position, as indicated by phantom lines, the state shown beneath the spool axis of FIG. 1 is switched into the state shown above the spool axis. First, the pressing mechanism 46 is shifted left in the axial direction of the spool by pivoting the brake control lever 45. This presses the outer race of the bearing 31b and shifts it, and the spool 3 is pushed via the pinion gear 17, the plate spring 34, and the bearing 32b and shifted to the left in the axial direction of the spool (to the left in FIG. 1). As a result the braking disk 35 is also shifted to the left in the axial direction. This results in the breaking disk 35 drawing close to the friction disk 36. Then, when the braking disk 35 comes into contact with the friction disk 36, which axially immovable and non-rotatable in the line reeling-out direction, drag force acts on the spool 3. When the brake control lever 45 is pivoted all the way to the maximum pivoting position, pressing force is maximized and a large drag force is achieved by the friction disk 36 pressing on the braking disk 35.

In this state, when the spool 3 rotates in the line reeling-in direction through rotation by the handle 4, the ratchet wheel 50 is also rotated via the friction disk 36 in the direction R (FIG. 5) in which the line is reeled in. This tugs the grasping member 52, by its friction with the ratchet wheel 50, in the direction R in which the line is reeled in. As a result the ratchet pawls 51 are urged toward the separated posture by the grasping member 52, and pivot into the separated posture to abut against the clamping member 55. Therefore, when the spool 3 rotates in the line reeling-in direction, no clicking sound is created by the collision of the ratchet wheel 50 and the ratchet pawls 51.

Meanwhile, when a fish is caught on the tackle and the spool 3 is rotated in the line reeling-out direction, the ratchet wheel 50 also rotates in the line reeling-out direction. In this situation, friction with the ratchet wheel 50 causes the grasping members 52 to be yanked in the line reeling-out direction, reverse to the line reeling-in direction R. As a result the ratchet pawls 51 are urged into the contact posture by the grasping members 52 and pivot into the contact posture. For this reason, when the spool 3 is rotated in the line reeling-out direction, the ratchet wheel 50 is prohibited from rotating in the line reeling-out direction. As a result the friction disk 36 is stopped from rotating in the line reeling-out direction, and the set drag force is applied to the spool 3.

The following explains the lever drag reel operating method.

When winding fishing line onto the spool, the handle 4 is rotated in the direction in which the line is reeled in. This transmits rotation from the handle 4 to the spool 3 via the handle shaft 5, the main gear 16, the pinion gear 17, the spool shaft 2, and the lever drag mechanism 7, and causes the spool 3 to rotate.

On the other hand, in the event that the spool 3 is locked if the tackle is snagged, the locking lever 27 is pivoted from the position indicated by solid lines in FIG. 2 into the position indicated by phantom lines. This causes the coil spring 26 to urge the shifting member 25 into the advanced position, interlocking the locking protrusion 25a with a locking recess 23, and locking the rotation of the spool 3 in the line reeling-out direction. In this state, after the line is reeled to take up line slack, the fishing rod is pointed toward the tackle and tugged directly back. Doing this breaks the snag, or the snagged fishing hook(s), fishing line or tangle therein, so that the terminal tackle or a portion of the tackle may be recovered.

Herein the brim 25b and the shaft 25c come into contact with the accommodating member 24, which exerts force on the shifting member 25. In this locking, the spool 3 is locked by engagement of the shifting member 25 with a locking recess 23 provided on the spool 3, which means that the spool 3 is locked directly and that the spool-locking mechanism 8 is less susceptible to breakage or deformation even if subjected to abnormal force. Furthermore, providing the locking recesses 23 on the outer surface of the flange portion 3b disposes the locking recesses 23 in a section that is equal to or greater than the normal winding diameter of the fishing line when the fishing line is being reeled out. For this reason, the force acting on the shifting member 25 is equal to or less than the tension on the fishing line. This makes it even more unlikely that the spool-locking mechanism 8 will be broken or deformed.

Because, as described above, the locking protrusion 25a is obtuse-angled on its downstream side on the line reeling-out direction, and because the coil spring 26 urges on the shifting member 25, the shifting member 25 is pressed by the locking recesses 23 and shifts into the retracted position when the spool 3 rotates in the line reeling-in direction. Thus, even if the spool 3 is mistakenly rotated in the line reeling-in direction during spool lock, abnormal force does not act on the rotation transmission mechanism 6.

On the other hand, removing the spool shaft 2 for reel maintenance or other reasons may cause viscous grease or friction to axially shift the ratchet wheel 50 together with the spool shaft 2. However, here the clamping members 55 stop the ratchet wheel 50 from escaping. For this reason, the ratchet wheel 50 will remain on the side plate 10 even if the spool shaft 2 is removed. Thus, when the spool shaft 2 is removed or attached, the grasping member 52 fitted on the ratchet pawls 51 will not be deformed or damaged.

Other Embodiments (a) In the preceding embodiment, an example of a lever drag-type dual-bearing reel with a drag mechanism provided around the spool axis was explained, but the present invention can also be applied to dual-bearing reels of a different type, such as ones with a star-drag type drag mechanism provided with a drag mechanism around the handle shaft.

(b) In the preceding embodiment, the spool-locking mechanism is provided on the side where the handle is mounted, but it is also possible to provide it on the opposite side.

(c) In the preceding embodiment, the spool-locking mechanism 8 permits rotation in the line reeling-in direction, but a configuration locking rotation in both directions is also possible.

(d) In the preceding embodiment, the lock plate 28 is provided on the outer surface of the flange 3b of the spool 3, and the lock plate 28 is provided with cutout locking recesses 23, but is also possible to form the locking recesses 23 directly in the outer surface of the flange 3b of the spool 3.

According to the present invention, because the spool is locked by engaging the locking piece with the locking recesses provided on the spool, the spool is locked directly and the spool-locking mechanism is made less susceptible to breakage or deformation even if subject to abnormal force. Furthermore, because the locking recesses are provided on the outer surface of the flange portion, the locking recesses are disposed in a section that is equal to or greater than the normal winding diameter of the fishing line when being reeled out. For this reason the force acting on the locking piece is equal to or less than the tension on the fishing line. This makes it even more unlikely that the spool-locking mechanism will be broken or deformed.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spool-locking mechanism for a dual-bearing reel for locking a spool, the spool having a pair of flange portions on its ends and fitted to a reel body of the dual-bearing-reel so as to be rotatable in either rotational direction, said dual-bearing reel spool-locking mechanism comprising:
   a locking piece fitted to the reel body for shifting into an advanced position and into a retracted position;
   a shifting mechanism for shifting said locking piece into the advanced position and into the retracted position; and
   a locking recess formed on one of the pair of flange portions on its outside face, into which said locking piece is engageable at its leading end when said locking piece is in the advanced position, said locking piece locking rotation of the spool in its line reeling-out direction by engaging with the flange portion while said locking piece is in the advanced position, but allowing rotation in its line reeling-in direction by momentarily shifting away from the advanced position and releasing the engagement with the flange potion.

2. A dual-bearing reel spool-locking mechanism as set forth in claim 1, wherein a plurality of said locking recesses is provided spaced circularly with respect to the spool rotationally.

3. A dual-bearing reel spool-locking mechanism as set forth in claim 1, wherein said locking piece is mounted on the reel body on its handle-fitting side.

4. A spool-locking mechanism for a dual-bearing reel as set forth in claim 1, wherein:
   said locking piece is fitted to the reel body for shifting into the advanced position and into the retracted position along a shifting axis parallel to the spool rotational axis, said locking piece having a shifting member whose end is engageable with said locking recess; and
   said shifting mechanism includes
      a pivot member mounted on the reel body pivotally around the shifting axis,
      an urging member for urging said shifting member into the advanced position, and
      a cam mechanism for shifting, in response to said pivot member pivoting, said shifting member from the advanced position into the retracted position against urging force of said urging member.

5. A dual-bearing reel spool-locking mechanism as set forth in claim 4, wherein
   said cam mechanism has a sloping cam face formed helically on said pivot member, and a cam pin fitted rear-endwise to said shifting member for being engaged by said sloping cam surface.

6. A spool-locking mechanism for a dual-bearing reel for locking a spool, the spool having a pair of flange portions on its ends and fitted to a reel body of the dual-bearing-reel so as to be rotatable in either rotational direction, said spool-locking mechanism locking rotation of the spool in at least its line reeling-out direction, said dual-bearing reel spool-locking mechanism comprising:
   a locking piece fitted to the reel body for shifting into an advanced position and into a retracted position;
   a shifting mechanism for shifting said locking piece into the advanced position and into the retracted position; and
   a plurality of locking recesses, provided on one of the pair of flange portions on its outside face, into which said locking piece is directly engageable at its leading end when said locking piece is in the advanced position, said plurality of locking recesses being provided spaced circularly in a rotational direction of the spool,
   said locking recesses being circumferentially spaced cut-outs formed in a ring-shaped lock plate mounted on the flange portion outside face.

7. A dual-bearing reel spool-locking mechanism as set forth in claim 6, wherein
   the flange portion outside face has concavities where it opposes said cut-outs formed in said ring-shaped lock plate.

8. A dual bearing reel, comprising:
   a reel body;
   a spool shaft mounted rotatably in a central part of said reel body;
   a spool rotatably but axially immovably supported on said spool shaft; and
   a handle disposed laterally on said reel body, said reel body having inside a rotation transmission mechanism for transmitting rotation from said handle to said spool,
   a drag mechanism for braking rotation of said spool in its line reeling-out direction,
   a reverse-check mechanism for checking rotation from said rotation transmission mechanism in the reeling-out direction, and
   a spool-locking mechanism for locking said spool, said spool-locking mechanism having
      a locking piece fitted to the reel body for shifting into an advanced position and into a retracted position;
      a shifting mechanism for shifting said locking piece into the advanced position and into the retracted position; and
      a locking recess, provided on one of the pair of flange portions on its outside face, into which said locking piece is engageable at its leading end when said locking piece is in the advanced position.

9. A dual-bearing reel as set forth in claim 8, wherein said locking piece locks rotation of said spool in its line reeling-out direction by engaging with said flange portion while said locking piece is in the advanced position, but allows rotation in its line reeling-in direction by momentarily shifting away from the advanced position and releasing the engagement with said flange potion.

10. A dual-bearing reel as set forth in claim 8, wherein a plurality of said locking recesses is provided spaced circularly with respect to said spool rotationally.

11. A dual-bearing reel as set forth in claim 10, wherein said locking recesses are circumferentially spaced cut-outs formed in a ring-shaped lock plate mounted on said flange portion outside face.

12. A dual-bearing reel as set forth in claim 11; wherein said flange portion outside face has concavities where it opposes said cut-outs formed in said ring-shaped lock plate.

13. A dual-bearing reel as set forth in claim 8, wherein said locking piece is mounted on said reel body on its handle-fitting side.

14. A dual-bearing reel as set forth in claim 8, wherein:
said locking piece is fitted to said reel body for shifting into the advanced position and into the retracted position along a shifting axis parallel the spool rotational axis, and has a shifting member for leading-end engagement into said locking recess; and
said shifting mechanism includes
a pivot member mounted on the reel body pivotally around the shifting axis,
an urging member for urging said shifting member into the advanced position, and
a cam mechanism for shifting, in response said pivot member pivoting, said shifting member from the advanced position into the retracted position against urging force of said urging member.

15. A dual-bearing reel as set forth in claim 14, wherein said cam mechanism has a sloping cam face formed helically on said pivot member, and a cam pin fitted rear-endwise to said shifting member for being engaged by the slanted cam surface.

* * * * *